United States Patent [19]

Decker et al.

[11] Patent Number: 5,356,499

[45] Date of Patent: Oct. 18, 1994

[54] METHOD FOR INCREASING FIBER STRENGTH TRANSLATION IN COMPOSITE PRESSURE VESSELS USING MATRIX RESIN FORMULATIONS CONTAINING SURFACE ACTING AGENTS

[75] Inventors: Owen H. Decker, West Reading, Pa.; Ben A. Lloyd; Neal A. Mumford, both of Brigham City, Utah

[73] Assignee: Thiokol Corporation, Ogden, Utah

[21] Appl. No.: 81,839

[22] Filed: Jun. 23, 1993

Related U.S. Application Data

[63] Continuation of Ser. No. 426,890, Oct. 25, 1989, abandoned.

[51] Int. Cl.$^5$ .................. B29C 71/00; B65H 81/00
[52] U.S. Cl. .................. 156/175; 156/275.5; 156/330
[58] Field of Search ......... 156/169, 173, 175, 273.5, 156/275.5, 330; 264/257, 258; 252/182.13; 528/103

[56] References Cited

U.S. PATENT DOCUMENTS

| | | | |
|---|---|---|---|
| 3,403,199 | 9/1968 | Ramos | 528/103 |
| 3,488,404 | 1/1970 | Parker, Jr. | 528/103 |
| 3,919,386 | 11/1975 | Segal | 264/255 |
| 3,983,289 | 9/1976 | Nishizaki et al. | 528/103 |
| 4,088,633 | 5/1978 | Gurnoy | 528/103 |
| 4,092,443 | 5/1978 | Groon | 427/53.1 |
| 4,117,361 | 9/1978 | Smith et al. | 528/103 |
| 4,421,806 | 12/1983 | Marks et al. | 156/175 |
| 4,447,586 | 5/1984 | Shimp | 252/182.13 |
| 4,479,984 | 10/1984 | Levy et al. | 427/44 |
| 4,601,769 | 7/1986 | DeHoff | 156/169 |
| 4,624,885 | 11/1986 | Mumford et al. | 156/175 |
| 4,767,017 | 8/1988 | Logullo, Sr. et al. | 156/175 |
| 4,775,736 | 10/1988 | Wiggins | 252/182.13 |
| 4,892,764 | 1/1990 | Drain et al. | 156/173 |
| 5,011,721 | 4/1991 | Decker et al. | 428/36.9 |

OTHER PUBLICATIONS

Sugerman, G. et al., "Enhanced Bonding of Fiber Reinforcements to Thermoset Resins", paper presented at 20th Int'l. Soc. for the Adv. of Mat'l. and Process Eng. Tech. Conf., Sep. 27–29, 1988 in Minneapolis, Minn.

*Primary Examiner*—Jay H. Woo
*Assistant Examiner*—Robert B. Davis
*Attorney, Agent, or Firm*—Madson & Metcalf

[57] ABSTRACT

Composite pressure vessels having improved fiber strength translation of the unidirectional, axial, impregnated strand or tow strength delivered in tensile strength of hoop fibers of the composite pressure vessel are obtained by a process in which chemorheologically viscosity tailored matrix resin formulations containing surface-active agents or compounds acting as surface-active agents are employed. The use of chemorheologically viscosity tailored matrix resin formulations containing such agents in such a process also reduces the strength variation of pressure vessels produced from prepreg of the matrix resin formulations containing surface-active agents or compounds acting as surface-active agents.

16 Claims, No Drawings

METHOD FOR INCREASING FIBER STRENGTH TRANSLATION IN COMPOSITE PRESSURE VESSELS USING MATRIX RESIN FORMULATIONS CONTAINING SURFACE ACTING AGENTS

This application is a continuation of U.S. application Ser. No. 07/426,890, filed Oct. 25, 1989 and now abandoned, for METHOD FOR INCREASING FIBER STRENGTH TRANSLATION IN COMPOSITE PRESSURE VESSELS USING MATRIX RESIN FORMULATIONS CONTAINING SURFACE ACTING AGENTS.

FIELD OF THE INVENTION

This invention relates to a method for obtaining composite pressure vessels of improved delivered tensile strength of hoop fibers expressed as a percent of the tow strength and reduced strength variation in said composite pressure vessels. The invention further relates to the use of surface-active agents, surfactants or compounds acting as surface-active agents to improve the fiber strength translation in composite pressure vessels and to improve prepreg uniformity, when such prepregs are employed to produce composite pressure vessels, by reducing the variation in strength of said composite pressure vessels.

BACKGROUND OF THE INVENTION

Solid propellant rocket motor cases for missile systems, spacecraft boosters and other types of large and small high performance, lightweight pressure vessels are commonly made from fiber reinforcement and various formulations of polyepoxide resins (epoxy resins) by a filament winding process. Similarly, filament winding with both polyesters and epoxy resins has made possible production of lightweight tanks, poles, piping and the like. Historically, fiberglass has been the most common reinforcement fiber, but other fibers such as carbon filaments, boron filaments, and high modulus organic polymer filaments, most significantly aramid filaments, have become increasingly useful in these composite structures to take advantage of their differing and sometimes unique physical properties.

The resins utilized are typically epoxy formulations based on diglycidyl ether-bisphenol A (DGEBA), reactive low molecular weight epoxy diluents and curing agents such as aliphatic and aromatic amines and carboxylic acid anhydrides. Both flexibilized and rigid epoxy resins have been used as matrix resins for filament wound composite structures.

In providing composite articles, such as the aforesaid pressure vessels, one has employed either a wet winding process or a prepreg process. When the resin-fiber combination is to be employed in wet winding, the fiber is simply run through a resin bath containing the resin composition whereby the fiber is coated with the composition. The resulting resin-fiber combination is then wound directly into the desired structure. On the other hand, if a prepreg is to be used, the fiber or "tow" is impregnated with a curable resin composition and then the resulting "tow" wound on a spool as a prepreg and stored for winding at a future time. When the prepreg is converted into a composite article, the prepreg is then typically cured by polymerization by means of heat or radiation.

One drawback encountered in the production of composite pressure vessels has been the fall-off or reduction in pressure vessel tensile strength compared to the unidirectional, axial impregnated tow tensile strength. A common measure of performance in composite pressure vessels is fiber strength translation of such tow strength to delivered tensile strength of the hoop fibers of the composite pressure vessel. Improved fiber strength translation of even a few percent is significant and valuable since fiber strength translation directly effects the design, weight, strength and cost of such pressure vessels. Thus, a highly desirable object would be to increase the tow or fiber strength translation into delivered tensile strength of hoop fibers of composite pressure vessels expressed as a percent of the tow strength.

A further drawback resides in the variation of the material from which the composite pressure vessels are produced. For pressure vessels the material strength used in designing (or design allowable strength) is the average strength of the test pressure vessels less three times the coefficient of variation (CV). For example, if the average strength is 90% of the tow strength and the standard deviation is 3%, the design allowable strength is 82% of the tow strength i.e.

$$\frac{90(100 - 3(3))}{100} = 82.$$

Historical precedent suggests that composite pressure vessels fabricated by wet-winding have CV's of about 4 to 8% while pressure vessels fabricated from prepregs have CV's of approximately 2–4%. It would therefore be highly desirable to significantly reduce the CV's to below these values.

SUMMARY OF THE INVENTION

Composite pressure vessels having improved fiber strength translation of the unidirectional, axial, impregnated strand or tow strength delivered in tensile strength of hoop fibers of the composite pressure vessel are obtained by a process in which matrix resin formulations containing surface-active agents or compounds acting as surface-active agents are employed. As used hereinafter, the term surface-active agent is inclusive of both surface-active agent and compounds acting as surface-active agents. The use of matrix resin formulations containing such agents in such a process also reduces the strength variation of pressure vessels produced from prepreg of the matrix resin formulations containing surface-active agents or compounds acting as surface-active agents.

DETAILED DESCRIPTION OF THE INVENTION

Improved fiber strength translation and reduction in the strength variation in composite pressure vessels is obtained according to this invention by producing such composite pressure vessels from chemorheologically viscosity tailored matrix resin-fiber tows in which the matrix resin formulation has present an effective amount of a surface-active agent or compound acting as a surface-active agent.

An especially preferred embodiment of the present invention comprises the use of a surface-active agent in a matrix resin formulation wherein the matrix resin formulation is a chemorheologically viscosity tailored matrix resin formulation such as those disclosed in copending U.S. patent application Ser. No. 07/422,989, filed on Oct. 16, 1989, now U.S. Pat. No. 5,011,721. Such chemorheologically viscosity tailored resin formulations are those which comprise a curable matrix resin and an effective amount of a reactive resin curing agent reactive at room temperature and a latent resin curing agent substantially non-reactive at room temperature but activated upon heating or radiation such that the matrix resin formulation is adapted upon formulation to have a viscosity sufficiently low enough to enable the matrix resin to impregnate a filament or fiber at room temperature without the necessity for the application of heat or solvent and which, upon standing at room temperature after impregnation into the fiber or filament to form a prepreg composition, rises in viscosity to a viscosity level sufficiently high to prevent excessive bleed of the matrix resin from winding tension upon spooling of the prepreg yet of sufficiently low enough viscosity to allow the prepreg to tack and drape in order to nestle and set during winding of a filament wound composite article from said prepreg after room temperature storage of the spooled prepreg material, and which matrix resin in the prepreg experiences a reduction in viscosity upon heating the prepreg composition, to a viscosity minimum sufficiently low to allow the matrix resin in the heated prepreg to flow and substantially eliminate formation of voids in the winding of a composite article from said prepreg yet not so low as to permit excessive bleeding of the matrix resin from the prepreg and with the continued application of heat to the filament wound composite article to permit the matrix resin in the filament wound composite article to cure to a hardened or gelled state.

As examples of such preferred chemorheologically viscosity tailored matrix resin formulations to which a surface-active agent of this invention may be added are those containing an epoxy resin based on a diglycidyl ether of bisphenol A and containing 1,4-butanediol diglycidyl ether as a reactive diluent, a reactive curing agent selected from aliphatic and aromatic amines such as, for example, 4-chloroaniline, 4-ethylaniline, ethyl-4-aminobenzoate, bis(4-aminophenoxyphenyl) sulfone, diethyl toluenediamine, methylene bis(2,6-diisopropylaniline), ortho-toluidine, p-anisidine and a 60/40% ratio of 4,4'-diaminodiphenylmethane and meta-phenylenediamine, and the like and mixtures thereof, especially 4-ethylaniline and a latent hardener selected from a blocked Lewis acid such as boron trifluoride monoethylamine, or 4,4'-sulfonyldianiline, and the like and mixtures thereof, especially boron trifluoride monoethylamine.

An especially preferred matrix resin formulation for use in the process of this invention comprises an epoxy resin based on a diglycidyl ether of bisphenol A, 1,4-butanediol diglycidyl ether, 4-ethylaniline or meta phenylenediamine and methylene bis(2,6-diisopropylaniline), boron trifluoride monoethylamine and a surface-active agent selected from N-octylpyrrolidone, neopentyl(diallyl)oxy tri(p-amino) benzoato zirconate or a fluorinated alkyl ester surfactant.

Any suitable matrix resin capable of being formulated into a chemorheologically viscosity tailored matrix resin formulation may be employed in the process of this invention. Examples of such suitable curable matrix resins include, but are not limited to epoxy resins, bismaleimide resins, polyurethanes, polyesters and the like. The matrix material is preferably an epoxy resin and most preferably an epoxy resin formulation based on diglycidylether-bisphenol A. As further examples of the suitable preferred epoxy matrix resins there may be mentioned, for example, alicyclic diepoxide carboxylate resins such as Ciba-Geigy's CY-179 epoxy resin; diglycidyl ether-bisphenol A epoxy resins such as Dow Chemical Co.'s DER 332, DER 383 and DER 661 and Shell Chemical Co.'s EPON 826 and EPON 828; 1,4-butanediol diglycidylether such as Celanese Chemical Co.'s Epi-Rez 5022; polyglycol diepoxide resin such as Dow Chemical Co.'s DER 732; a bisphenol F/epichlorohydrin epoxy resin such as Shell Chemical Co.'s DPL 862; an epichlorohydrin/tetraphenylol ethane epoxy resin such as Shell Chemical Co.'s EPON 1031 and mixtures thereof.

Similarly, any suitable fiber or filament material in a form suitable for forming composite pressure vessels may be employed in the process of this invention. Examples of suitable fiber or filament materials include but are not limited to glass fibers, boron filaments, boron nitride, silicon carbide, graphite (carbon) filaments and high modulus organic filaments such as organic filaments of the polyethylene and aramid type. Examples of high modulus organic filaments include, but are not limited to, poly (benzothiazoles) and poly (aromatic amides) which are commonly referred to simply as "aramids". Aramids include poly (benzamides) and family of materials sold by E. I. DuPont under the trademark KEVLAR. KEVLAR 49 is an aramid fiber with improved fiber stress performance in pressure vessels. As an example of carbon filaments useful in this invention, there may be mentioned, for example, Amoco Chemical Corp.'s T-40 and Toray's T-800H carbon fibers. Carbon filaments are the preferred fiber or filament materials.

The matrix resin formulation employed in the process of this invention will contain sufficient surface-active agent to permit wetting of the reinforcing fiber or filament by a matrix resin but not too much so as to adversely interfere with the bond between the resin and fiber or filament. Generally, the surface-active agent will be present in the formulation in an amount of up to about 1% by weight, generally from about 0.01 to about 0.5% and preferably from about 0.05 to about 0.10% by weight based on the weight of the matrix resin formulation. Although it may be possible to employ more surface-active agent than 1% by weight, any significantly greater amount may lead to an undesirable lessening or absence of bond strength.

It is quite surprising that the presence of a surface-active agent in a matrix resin formulation would permit an improvement in fiber strength translation and a reduction in the strength variation in composite pressure vessels fabricated therefrom since better bonding of the matrix resin to the fiber or filament material has been found not to improve fiber strength translation. Heretofore, when a fiber surface has been oxidized to obtain better bonding between fiber and matrix resin, translation of fiber strength to tensile strength of a pressure vessel has been found to decrease, i.e. the tensile strength of the hoop fibers is lowered compared to the tensile strength of the hoop fibers in a similarly prepared pressure vessel but where the fiber surface has not been oxidized. Lowering of the oxidized level of the fiber surface has produced lower bond strength between matrix resin and fiber and produced better pressure vessel strength. Thus, greater bond strength does not necessarily lead to greater pressure vessel tensile strength.

While the mode of action of the surface-active agents in the process of the present invention is not completely understood, it is believed that the surface-active agents contribute to the unexpected enhancement of fiber strength by enhancing fiber wet-out by the matrix resin and thereby producing a more even distribution of matrix resin with the fiber bundles thereby possibly eliminating voids.

Any suitable surface-active agent or compound acting as a surface-active agent may be employed in the process of this invention, that is, surface-active agents, wetting agents, surfactants and coupling agents acting as surface-active agents may be employed. Any such agent or compound which promotes the wetting of a reinforcing fiber or filament by a matrix resin may suitably be employed. Examples of such suitable surface-active agents or compounds acting as surface-active agents include but are not limited to N-octyl pyrrolidone; FLUORAD surfactants such as potassium fluoralkyl carboxylates, fluorinated alkyl polyoxyethylene ethanols and fluorinated alkyl ester surfactants from 3M; cationic quaternary ammonium chloride derivatives of polypropoxy tertiary amines sold by Witco Chemical Corp. under the Trademark EMCOL, for example, EMCOL CC36; a fatty imidazolene salt sold by Witco Chemical Corp. as Witcamine PA-78B; wetting agents such as alkylated silicone siloxane copolymer from Byk-Chemie and sold as BYK A-525 and BYK W-980; neoalkoxy zirconate and neoalkoxy titanate coupling agents such as Ken React LZ-37, Ken React LZ-97 and LICA 44 sold by Kenrich Petrochemicals, Inc.; a copolyacrylate wetting agent sold by Henkel Corporation as Perenol F-40; bis(hexamethylene) triamine; oleiamide of tri and tetraethylene amines and an oleic acid salt of oleimide of N,N-dimethylpropyldiamine sold as Pave 192 by the Carstab division of Morton International, Inc.; decyl alcohol ethoxylate (~4 moles ethylene oxide) and decyl alcohol ethoxylate (~6 moles ethylene oxide) sold as DeTHOX DA-4 and DeTHOX DA-6, respectively by DeForest, Inc.; sodium dioctyl sulfosuccinate; nonylphenoxypoly(ethaneoxy) ethanol sold as Igepal CO-430 by GAF Corp., and the like.

Especially preferred as surface-active agents for use in the process of this invention are N-octyl pyrrolidone, neopentyl(diallyl)oxy tri(p-amino) benzoato zirconate (LZ-37) and fluorinated alkyl ester surfactant (FLUORAD FC-430).

The invention and the advantages to be obtained therefrom are illustrated by but not limited to the following examples. In the examples reference to matrix resin formulation A, B and C shall mean the formulations as identified in the following Table 1.

TABLE 1

| Component | Formulation A | Formulation B | Formulation C |
|---|---|---|---|
| | Parts By Weight | | |
| Bisphenol F/Epichlorohydrin epoxy - Shell DPT 862 | 120.00 | — | — |
| 1,4-Butanediol diglycidyl ether - Wilmington Chem. WC-67 | 38.21 | — | — |
| Diglycidyl ether of bisphenol A - Shell Epon 828 | — | — | 80.00 |
| 1,4-Butanediol diglycidyl ether - Celanese Epi Rez 5022 | — | — | 20.00 |
| Diglycidyl ether of bisphenol A - Dow DER 383 | — | 110.00 | — |
| Polyglycol diepoxide - Dow DER 732 | — | 55.00 | — |
| 4-Ethylaniline | — | 13.49 | — |
| Boron trifluoride monoethylamine | 4.19 | 4.37 | — |
| Meta phenylenediamine | 5.26 | — | — |
| Methylene bis(2,6-diisopropylaniline) | 26.80 | — | — |
| 60% 4,4'-diaminodiphenylmethane / 40% meta phenylediamine (Uniroyal Tonox 60/40) | — | — | 24.00 |

It is to be noted that Formulations A and B are chemorheologically viscosity tailored matrix resin formulations, as described in the aforementioned copending application Ser. No. 07/422.989, now U.S. Pat. No. 5,011,721.

EXAMPLES 1–21

Each of the aforesaid matrix resin Formulations A, B and C was employed alone as a control and then with surface-active agent present in the formulation. The fiber employed was a carbon fiber (Amoco's T-40 or Toray's T-800H). The formulations were employed to produce wet-wound (Examples 1–14 and 21) or preg-wound (Examples 15–20) pressure vessels (bottles) of 5.75" diameter of the same design. The bottles were then burst-test on the same equipment by the same test engineers according to a procedure generally described in ASTM D2585–68. Translation is defined as the measure of the percent of unidirectional axial, impregnated tow strength which is delivered in tensile strength of hoop fibers. The enhanced fiber strength translation obtained with the formulations of this invention containing surface-active agents (Examples 1–21) compared to the control Formulations A, B and C without surface-active agent is set forth in the following Table 2. The surface-active agents employed in the examples were the following:

LP100 = N-octyl pyrrolidone
LZ-37 = Neopentyl(diallyl)oxy tri(p-amino) benzoato zirconate
FC-430 = FLUORAD fluorinated alkyl ester from 3M.

TABLE 2

| Example No. | Formulation | Surface-active Agent | Surface-active Agent Concentration (Wt. %) | Average Translation % | CV (%) |
|---|---|---|---|---|---|
| (Wet-Wind | | | | | |

TABLE 2-continued

| Example No. | Formulation | Surface-active Agent | Surface-active Agent Concentration (Wt. %) | Average Translation % | CV (%) |
|---|---|---|---|---|---|
| | C (Control) | — | 0.00 | 86.1 | 4.3 |
| 1 | C | FC-430 | 0.01 | 86.5 | — |
| 2 | C | FC-430 | 0.03 | 83.4 | — |
| 3 | C | FC-430 | 0.05 | 87.1 | 1.9 |
| 4 | C | FC-430 | 0.07 | 78.9 | — |
| 5 | C | FC-430 | 0.10 | 90.0 | — |
| 6 | C | FC-430 | 0.20 | 83.1 | — |
| 7 | C | FC-430 | 0.40 | 82.5 | — |
| 8 | C | FC-430 | 0.80 | 80.7 | 4.6 |
| 9 | C | LZ-37 | 0.05 | 84.1 | 4.6 |
| 10 | C | LZ-37 | 0.80 | 81.6 | 3.4 |
| — | A (Wet-Wind Control) | — | 0.00 | 61.6 | 12.9 |
| 11 | A | FC-430 | 0.05 | 77.9 | 8.4 |
| 12 | A | FC-430 | 0.80 | 74.7 | 7.8 |
| 13 | A | LZ-37 | 0.05 | 78.3 | 4.8 |
| 14 | A | LZ-37 | 0.80 | 80.3 | 2.5 |
| — | B (Prepreg Control) | — | 0.00 | 73.5 | 3.3 |
| 15 | B | LZ-37 | 0.10 | 88.8 | 2.9 |
| 16 | B | LZ-37 | 0.20 | 86.6 | 4.2 |
| 17 | B | LZ-37 | 0.40 | 88.4 | 2.8 |
| 18 | B | LP-100 | 0.10 | 88.8 | 0.03 |
| 19 | B | LP-100 | 0.20 | 88.8 | 1.3 |
| 20 | B | LP-100 | 0.40 | 87.2 | 1.8 |
| — | B (Wet-Wind Control) | — | 0.00 | 71.2 | 1.1 |
| 21 | B | LZ-37 | 0.20 | 79.4 | 3.7 |

From the test data it is seen that improved tow strength translation can be obtained for each of the chemorheologically viscosity tailored matrix resins by the addition of surface-active agents to the formulation. It is to be noted that the inclusion of a surface-active agent in the two chemorheologically viscosity tailored matrix resin Formulations A and B produces significant improvement in tow strength translation (up to about 20%) compared to that obtained with the non-chemorheologically viscosity tailored matrix resin Formulation C (about 4%). Moreover, it should be noted that the coefficients of variations (CV's) tended to go down as translation increased. Both of these effects would contribute significantly to increased material performance. This pattern of low CV's correlates well with the probable mode of action of the surface-active agents in increasing fiber strength translation in pressure vessels. Surface-active agents probably act to displace air along and between fibers, increasing the fiber surface area in contact with the matrix material. As contact area approaches total fiber surface area, strength variations due to differences in contact area decrease.

It should also be noted for matrix resin formulation A with FC-430 surface-active agent optimized tow strength translation was obtained with a surface-active concentration of from about 0.05 to 0.10% weight. No dependency of tow strength translation on concentration for surface-active agents LZ-37 and LP-100 with chemorheologically viscosity tailored matrix resin formulation B is apparent from the data.

A further example of a suitable chemorheologically viscosity tailored matrix resin formulation useful to produce pressure vessels having improved fiber strength translation is the following Formulation D.

| FORMULATION D | |
|---|---|
| Component | Parts by Weight |
| Diglycidyl ether of bisphenol A - Shell EPON 828 | 700.00 |
| Polyglycol diepoxide - Dow DER 732 | 336.00 |
| P-Anisidine | 75.63 |
| Boron trifluoride monoethylamine | 26.66 |
| Neopentyl(dialkyl)oxy, tri(p-amino)benzoato zirconate - Kenrich LZ-37 | 2.28 |

It will be apparent from the foregoing to those skilled in the art that any suitable surface-active agents such as those specifically mentioned hereinbefore as well as other surface-active agents can be employed with a wide variety of matrix resins in the improved process of this invention to obtain enhanced fiber strength translation and produce a reduction in the strength variation of the composite pressure vessels.

We claim:

1. A method for improving composite pressure vessel strength comprising:
   (a) providing a chemorheologically viscosity tailored resin formulation comprising a curable matrix resin and an effective amount of a reactive resin curing agent reactive at room temperature and a latent curing agent substantially non-reactive at room temperature but activated upon heating or radiation;
   (b) adding to said resin formulation an amount of surface-active agent sufficient to permit interaction between the fiber or filament and the resin formulation such that tensile strength is enhanced and variation in performance is reduced;

(c) impregnating a fiber or filament strand or tow with the mixture of resin formulation and surface-active agent;

(d) allowing the reactive resin curing agent to partially cure the resin formulation and increase its viscosity, thereby forming a prepreg composition;

(e) winding a pressure vessel from said strand or tow prepreg composition; and (f) activating the latent curing agent to further cure the resin formulation and form a composite pressure vessel.

2. A method according to claim 1 wherein the surface-active agent is present in the matrix resin formulation in an amount up to about 1% by weight.

3. A method according to claim 2 wherein the surface-active agent is present in the matrix resin formulation in an amount of from about 0.01 to about 0.5% by weight.

4. A method according to claim 2 wherein the surface-active agent is present in the matrix resin formulation in an amount of from about 0.05 to about 0.10% by weight.

5. A method according to claim 1 wherein the fiber is a carbon fiber and the matrix resin is an epoxy resin based on a diglycidyl ether of bisphenol A.

6. A method according to claim 3 wherein the fiber is a carbon fiber and the matrix resin is an epoxy resin based on a diglycidyl ether of bisphenol A.

7. A method according to claim 1 wherein the surface-active agent is selected from the group consisting of N-octyl pyrrolidone, a fluorinated alkyl ester surfactant and a neoalkoxy zirconate coupling agent.

8. A method according to claim 3 wherein the surface-active agent is selected from the group consisting of N-octyl pyrrolidone, a fluorinated alkyl ester surfactant and a neoalkoxy zirconate coupling agent.

9. A method according to claim 5 wherein the surface-active agent is selected from the group consisting of N-octyl pyrrolidone, a fluorinated alkyl ester surfactant and a neoalkoxy zirconate coupling agent.

10. A method according to claim 6 wherein the surface-active agent is selected from the group consisting of N-octyl pyrrolidone, a fluorinated alkyl ester surfactant and a neoalkoxy zirconate coupling agent.

11. A method according to claim 1 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

12. A method according to claim 5 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

13. A method according to claim 6 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

14. A method according to claim 7 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

15. A method according to claim 8 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

16. A method according to claim 10 wherein the matrix resin formulation is an epoxy resin based on diglycidyl ether of bisphenol A and 1,4-butanediol diglycidyl ether, the reactive curing agent is selected from the group consisting of 4-ethylaniline, meta phenylenediamine and methylene bis(2,6-diisopropylaniline) and the latent curing agent is boron trifluoride monoethylamine.

* * * * *